United States Patent
Okada et al.

(10) Patent No.: US 10,753,067 B2
(45) Date of Patent: Aug. 25, 2020

(54) CONSTRUCTION MACHINE

(71) Applicant: KOBELCO CONSTRUCTION MACHINERY CO., LTD., Hiroshima-shi (JP)

(72) Inventors: Tomofumi Okada, Hiroshima (JP); Ryuichi Hirose, Hiroshima (JP)

(73) Assignee: KOBELCO CONSTRUCTION MACHINERY CO., LTD., Hiroshima-shi (JP)

( * ) Notice: Subject to any disclaimer, the term of this patent is extended or adjusted under 35 U.S.C. 154(b) by 57 days.

(21) Appl. No.: 16/012,823

(22) Filed: Jun. 20, 2018

(65) Prior Publication Data

US 2019/0017246 A1  Jan. 17, 2019

(30) Foreign Application Priority Data

Jul. 14, 2017  (JP) .................................. 2017-138038

(51) Int. Cl.
*E02F 9/00* (2006.01)
*E02F 9/20* (2006.01)
(Continued)

(52) U.S. Cl.
CPC .......... *E02F 9/2033* (2013.01); *B60W 30/09* (2013.01); *E02F 3/32* (2013.01); *E02F 9/24* (2013.01);
(Continued)

(58) Field of Classification Search
USPC ......................................................... 701/50
See application file for complete search history.

(56) References Cited

U.S. PATENT DOCUMENTS

2003/0065431 A1* 4/2003 Ota ..................... B60R 21/0132
701/46
2018/0209122 A1* 7/2018 Kiyota .................... E02F 9/262

FOREIGN PATENT DOCUMENTS

JP  2007-23486  2/2007
JP  2007023486 A * 2/2007
(Continued)

OTHER PUBLICATIONS

Extended European Search Report dated Jan. 2, 2019 in corresponding European Patent Application No. 18178732.6, citing document AO therein, 8 pages.

*Primary Examiner* — James M McPherson
(74) *Attorney, Agent, or Firm* — Oblon, McClelland, Maier & Neustadt, L.L.P.

(57) ABSTRACT

A construction machine includes a vehicle body having, a moving section, a driving mechanism, a manipulation device that receives a manipulation, a controlling unit, a manipulation detecting unit that detects the manipulation given to the manipulation device, and an obstacle detecting device that detects an obstacle in a periphery of the vehicle body. The controlling unit executes emergency-stop-processing and continuous-stop-processing. The emergency-stop-processing is executed to stop the operation of the moving section regardless of a signal from the manipulation detecting unit upon detection of the obstacle by the obstacle detecting device when the controlling unit controls the driving mechanism to drive the moving section. The continuous-stop-processing is executed to keep the operation of the moving section stopped when the obstacle detecting device does not detect the obstacle and the manipulation detecting unit detects manipulation when the operation of the moving section is stopped by the emergency-stop-processing.

4 Claims, 5 Drawing Sheets

(51) Int. Cl.
*B60W 30/09* (2012.01)
*E02F 9/24* (2006.01)
*E02F 3/32* (2006.01)
*E02F 9/26* (2006.01)

(52) U.S. Cl.
CPC .............. *E02F 9/261* (2013.01); *E02F 9/262* (2013.01); *B60W 2554/00* (2020.02); *B60W 2710/30* (2013.01)

(56) References Cited

FOREIGN PATENT DOCUMENTS

| | | | | |
|---|---|---|---|---|
| JP | 2014181509 | A | * | 9/2014 |
| JP | 2015063864 | A | * | 4/2015 |
| WO | WO 2017/094627 | A1 | | 6/2017 |

* cited by examiner

CONSTRUCTION MACHINE

TECHNICAL FIELD

The present invention relates to a construction machine.

BACKGROUND

Japanese Unexamined Patent Application Publication No. 2007-23486 describes a technique of forcibly stopping an operation, such as slewing and backward travelling, of an upper slewing body when an obstacle (including a person) is detected in a collision prevention area determined in the periphery of the upper slewing body.

In the technique described above, when an operation is forcibly stopped but a manipulation instructing the operation is still being input to a manipulation device, stopping of operation is cancelled and the operation restarts when an obstacle that has been detected in the collision prevention area temporarily exits the area (that is, when a person that has been in the collision prevention area temporarily exits the collision prevention area). When the operation restarts simply by the obstacle temporarily exiting the collision prevention area as described above, the operation cannot be stopped immediately when the obstacle reenters the collision prevention area. This may cause a portion of the upper slewing body colliding against the obstacle. Moreover, in a case where the device for detecting an obstacle is a millimeter-wave radar, an obstacle that is vertically out of the range of the radio wave emitted by the millimeter-wave radar cannot be detected. Therefore, when an obstacle, which is detected in the collision prevention area (within the range of the radio wave), falls down, it is determined that the obstacle has moved outside the collision prevention area. Then stopping of operation is cancelled, and the operation restarts. Restarting of the operation with the obstacle still staying in a place where collision against a portion of the upper slewing body might happen may result in collision between the obstacle and the portion of the upper slewing body.

SUMMARY

An object of the present invention is to provide a construction machine capable of preventing collision against an obstacle.

Provided is a construction machine including a vehicle body having a moving section, a driving mechanism that generates a driving force to drive the moving section, a manipulation device that receives a manipulation given to drive the moving section, a controlling unit that controls an operation of the driving mechanism, a manipulation detecting unit that detects the manipulation given to the manipulation device and outputs a signal corresponding to an instruction of the manipulation to the controlling unit, and an obstacle detecting device that is mounted on the vehicle body to detect an obstacle in a periphery of the vehicle body, in which the controlling unit executes emergency-stop-processing and continuous-stop-processing, the emergency-stop-processing being executed to control the driving mechanism to stop an operation of the moving section regardless of a signal from the manipulation detecting unit, on a first condition satisfied upon detection of the obstacle by the obstacle detecting device when the controlling unit receives the signal from the manipulation detecting unit to control the driving mechanism to drive the moving section in accordance with a manipulation input to the manipulation device, the continuous-stop-processing being executed to control the driving mechanism to keep the operation of the moving section, which has been stopped by the emergency-stop-processing, stopped on a second condition satisfied by the obstacle detecting device not detecting the obstacle and the manipulation detecting unit detecting a manipulation given to the manipulation device when the operation of the moving section is stopped by the emergency-stop-processing.

BRIEF DESCRIPTION OF THE DRAWINGS

FIG. 2 is a block diagram illustrating a control system that the construction machine illustrated in FIG. 1 is equipped with;

FIGS. 5A and 5B illustrate an obstacle existing in a peripheral region of the vehicle body of the construction machine illustrated in FIG. 1, in which FIG. 5A illustrates a lower travelling body moving backward, and FIG. 5B illustrates an upper slewing body slewing rightward.

DETAILED DESCRIPTION

Figure 1:
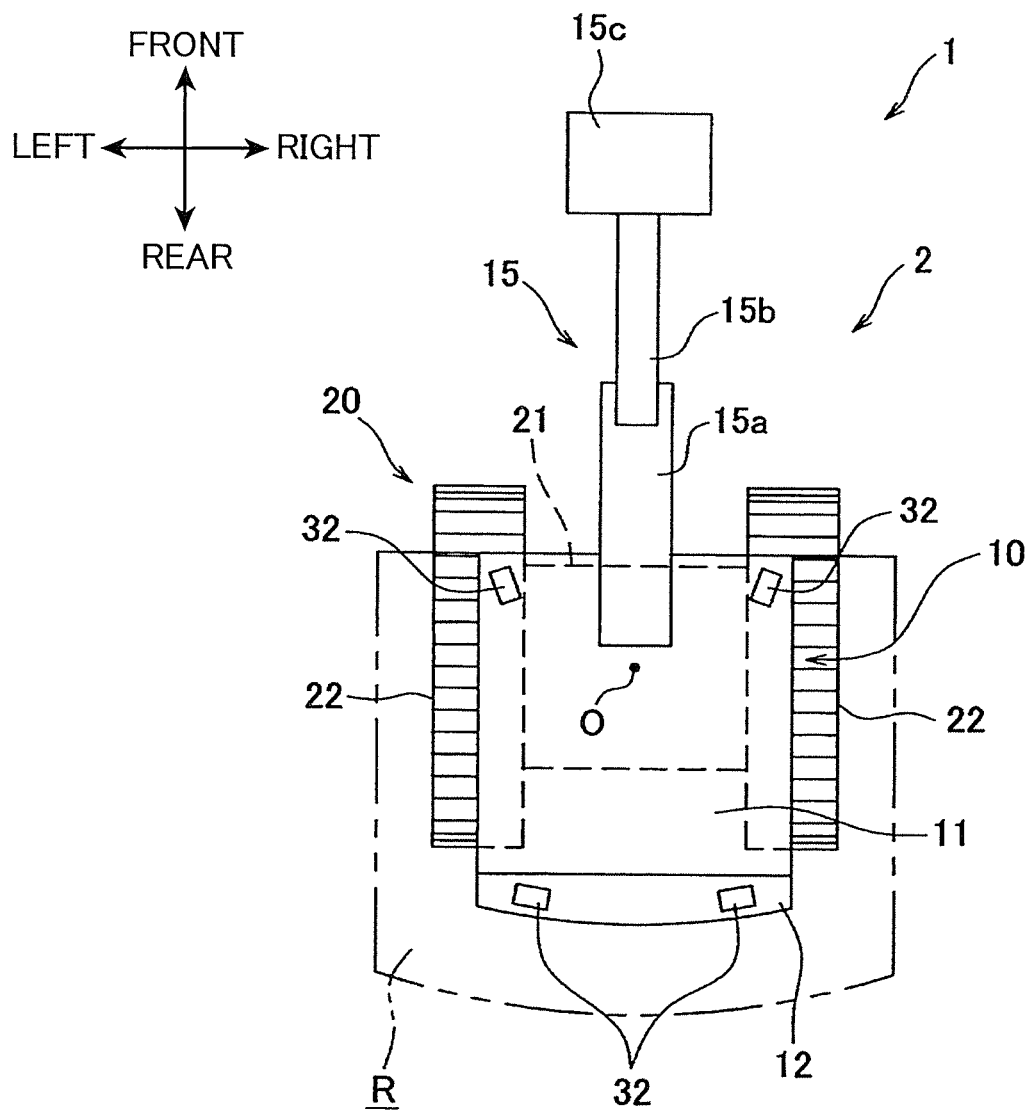
FIG. 1 is a schematic plan view illustrating a construction machine according to an embodiment of the present invention.
Figure 1:
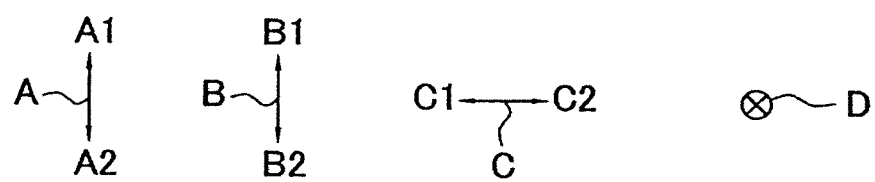
Figure 2:
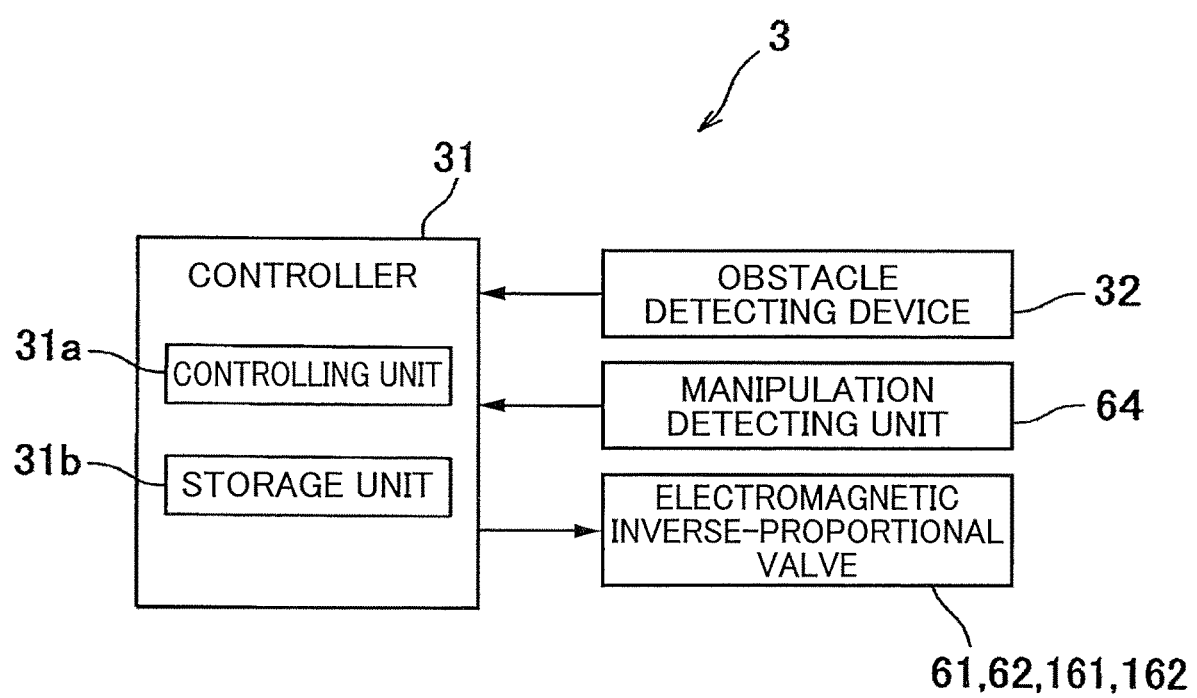
Figure 3:
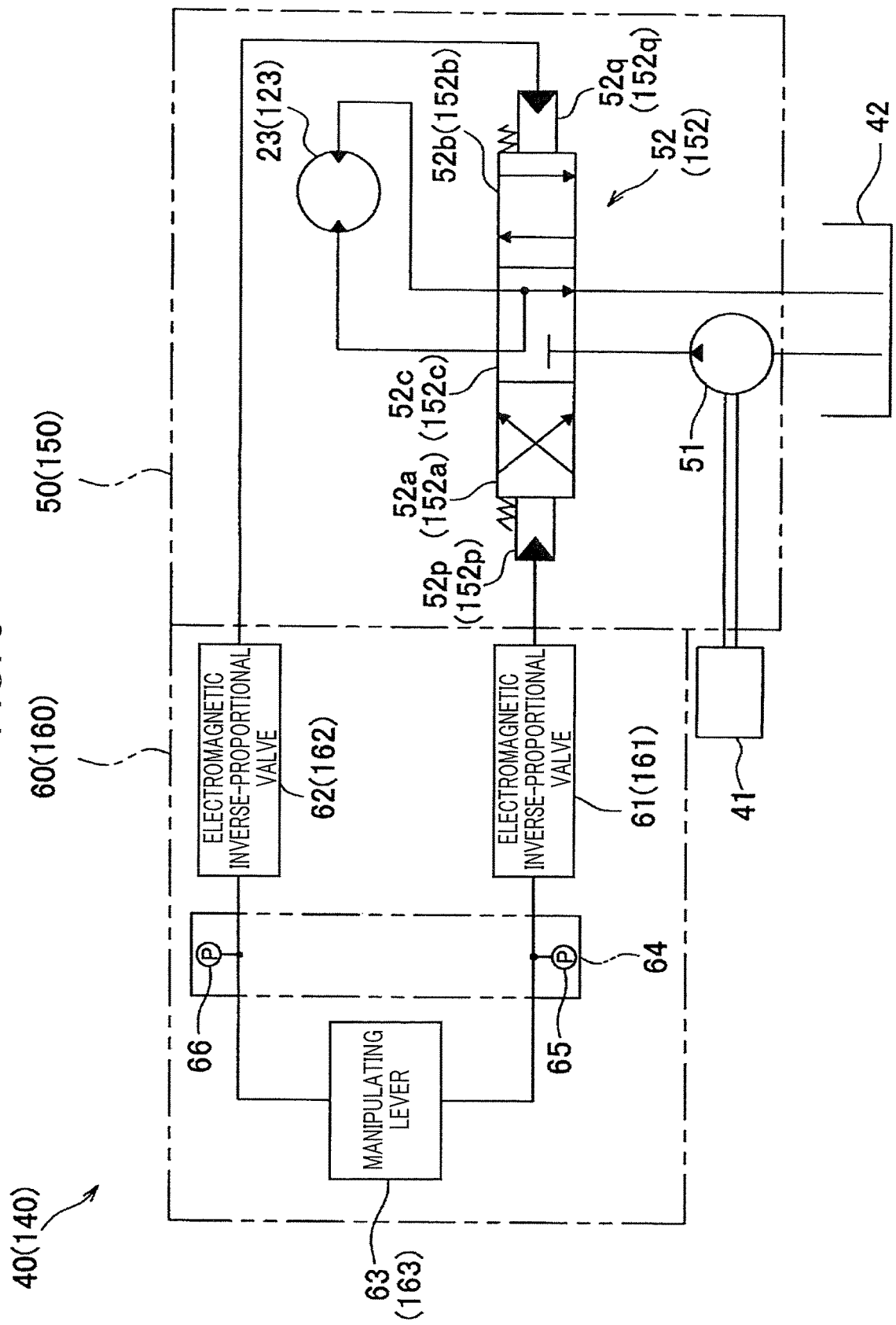
FIG. 3 is a diagram of a hydraulic circuit for operating a vehicle body of the construction machine illustrated in FIG. 1.

A construction machine 1 according to an embodiment of the present invention will now be described with reference to FIGS. 1 to 3. FIG. 1 is a schematic plan view illustrating a construction machine 1 according to the embodiment. FIG. 2 is a block diagram illustrating a control system 3 that the construction machine 1 illustrated in FIG. 1 is equipped with. FIG. 3 is a diagram of a hydraulic circuit for operating a vehicle body 2 of the construction machine 1 illustrated in FIG. 1. The construction machine 1 is a machine that performs construction work, for example, digging. In the embodiment, the construction machine 1 is a hydraulic excavator. The construction machine 1 is not limited to a hydraulic excavator but may be a travelling crane. As illustrated in FIGS. 1 and 2, the construction machine 1 includes the vehicle body 2 and the control system 3 (see FIG. 2).

The vehicle body 2 includes an upper slewing body 10 and a lower travelling body 20. The lower travelling body 20 drives the construction machine 1. The lower travelling body 20 includes a lower body 21 and a pair of crawlers 22 (moving section). As illustrated in FIG. 1, the crawlers 22 are attached to the left side and the right side of the lower body 21. As illustrated in FIG. 1, the direction in which the crawler 22 extends is a front-and-rear direction (A) of the lower travelling body 20. With regards to the front-and-rear direction (A) of the lower travelling body 20, one direction is defined as a forward direction (A1) of the lower travelling body 20 and the opposite direction is defined as a rearward direction (A2) of the lower travelling body 20. For example, a hydraulic motor 23 (see FIG. 3) for operating the crawler 22 is provided in the rear part of the lower travelling body 20.

The upper slewing body 10 (moving section) slews about the slew center O relative to the lower travelling body 20. The upper slewing body 10 is mounted on the lower body 21 via a slewing device (not shown). The upper slewing body 10 includes an upper body 11, a cabin (not shown), and a counter weight 12. An upper attachment 15 is attached to the upper slewing body 10. With regard to a front-and-rear direction (B) of the upper slewing body 10, the direction from the counter weight 12 to the upper attachment 15 is defined as a forward direction (B1) of the upper slewing body 10 and the opposite direction is defined as a rearward direction (B2) of the upper slewing body 10. The direction perpendicular to both a vertical direction (D) (direction normal to the sheet on which FIG. 1 is drawn) and the front-and-rear direction (B) of the upper slewing body 10 is defined as a lateral direction (C) of the upper slewing body 10. With regard to the lateral direction (C) of the upper slewing body 10, the leftward direction, when the upper slewing body 10 is viewed from the rear side, is defined as a leftward direction (C1) of the upper slewing body 10 and the rightward direction is defined as a rightward direction (C2) of the upper slewing body 10.

The upper body 11 is a main part of the upper slewing body 10. Components such as an engine (not shown) are mounted on the upper body 11. A cabin is where an operator (a manipulator of the construction machine 1) manipulates to drive the construction machine 1. A manipulating lever 63 (see FIG. 3) for manipulating the lower travelling body 20 and a manipulating lever 163 (see FIG. 3) for manipulating the upper slewing body 10 are provided in the cabin. The counter weight 12 is for adjusting the weight balance of the construction machine 1 along the front-and-rear direction. The counter weight 12 is provided in the rear part of the upper body 11. The upper attachment 15 is provided in, for example, the front part of the upper body 11 to perform a work, such as digging. For example, the upper attachment 15 includes a boom 15a, an arm 15b, and a bucket 15c.

The construction machine 1 includes a hydraulic circuit 40 for operating the lower travelling body 20 and a hydraulic circuit 140 for operating the upper slewing body 10 as illustrated in FIG. 3. Since the hydraulic circuit 40 and the hydraulic circuit 140 are configured almost the same, reference signs related to the configuration of the hydraulic circuit 140 are written in parentheses in FIG. 3. The hydraulic circuit 40 will be described as a circuit for controlling an operation of the hydraulic motor 23 that drives one of the two crawlers 22. The construction machine 1 includes a circuit for controlling an operation of the hydraulic motor 23 that drives the other one of the two crawlers 22. This circuit is similar to a drive circuit 50 and a pilot circuit 60, which will be described later, but is provided as a separate circuit. A single hydraulic pump 51 may commonly be used for the two drive circuits 50, or alternatively, a single pilot pump may commonly be used for the two pilot circuits 60.

As illustrated in FIG. 3, the hydraulic circuit 40 includes a power source 41, a tank 42, the drive circuit 50, and the pilot circuit 60. The power source 41 (engine) is a driving source of the construction machine 1. The tank 42 stores oil. The drive circuit 50 is for driving the hydraulic motor 23 and includes the hydraulic pump 51, the hydraulic motor 23 (driving mechanism), and a control valve 52. The hydraulic pump 51 is driven by the power source 41 to supply oil from the tank 42 to the hydraulic motor 23.

The hydraulic motor 23 operates the crawler 22 to drive the lower travelling body 20. That is, the hydraulic motor 23 generates a driving force for driving the crawler 22. The control valve 52 controls an operation of the hydraulic motor 23. The control valve 52 controls the flow rate and the direction of oil supplied from the hydraulic pump 51 to the hydraulic motor 23 to control the operating speed and the operating direction of the hydraulic motor 23. The control valve 52 is provided between the hydraulic motor 23 and the hydraulic pump 51. The control valve 52 is a three-way switching valve that has three switching positions. The control valve 52 is a spool valve in which the valve opening and the switching position are changed according to the position of the spool. The control valve 52 is a pilot valve in which the position of the spool changes according to the pilot pressure input to the control valve 52. In more detail, the operating speed of the hydraulic motor 23, that is, the travelling speed of the lower travelling body 20, becomes slower for a lower pilot pressure that creates a smaller valve opening. The control valve 52 has different switching positions which are a first operating position 52a, a second operating position 52b, and a neutral position 52c. The control valve 52 has a pilot chamber 52p and an opposing pilot chamber 52q.

The first operating position 52a and the second operating position 52b are for operating the hydraulic motor 23 and where the oil is supplied from the hydraulic pump 51 to the hydraulic motor 23. The first operating position 52a is for moving the crawler 22 in the forward direction (A1) of the lower travelling body 20. The second operating position 52b is for moving the crawler 22 in the rearward direction (A2) of the lower travelling body 20. The neutral position 52c is for stopping the hydraulic motor 23 and where the oil path between the hydraulic pump 51 and the hydraulic motor 23 is cut off.

The pilot pressure is input to each of the pilot chamber 52p and the opposing pilot chamber 52q. The pilot chamber 52p and the opposing pilot chamber 52q are each connected to a pilot pump (not shown). The switching position of the control valve 52 is changed according to the difference between the pilot pressure input to the pilot chamber 52p and the pilot pressure input to the opposing pilot chamber 52q. The control valve 52 is set to the neutral position 52c when the pilot pressure input to the pilot chamber 52p is equal to the pilot pressure input to the opposing pilot chamber 52q. When the pilot pressure input to the pilot chamber 52p is higher than the pilot pressure input to the opposing pilot chamber 52q, the control valve 52 is set to the first operating position 52a. When the pilot pressure input to the opposing pilot chamber 52q is higher than the pilot pressure input to the pilot chamber 52p, the control valve 52 is set to the second operating position 52b.

The pilot circuit 60 controls the pilot pressure. The pilot circuit 60 includes the pilot pump (not shown), two electromagnetic inverse-proportional valves 61 and 62, the manipulating lever 63, and a manipulation detecting unit 64. The manipulation detecting unit 64 includes six pressure sensors 65 and 66. Two of the six pressure sensors 65 and 66 are included in the single pilot circuit 60. Among the other four pressure sensors 65 and 66, two pressure sensors 65 and 66 are included in the pilot circuit 60 for driving the other crawler 22 and the other pressure sensors 65 and 66 are included in a pilot circuit 160 for slewing the upper slewing body 10. The two pressure sensors 65 and 66 included in the pilot circuit 60 are disposed to measure the pressure value of the oil path connecting the manipulating lever 63 and the pilot chamber 52p and the pressure value of the oil path connecting the manipulating lever 63 and the opposing pilot chamber 52q. The manipulation detecting unit 64 detects the pressure applied, with the manipulating lever 63 manipulated by an operator, to the primary side of the electromagnetic inverse-proportional valves 61 and 62, and outputs the pressure to a controller 31 which will be described later. The pilot pump is connected to the pilot chamber 52p and the opposing pilot chamber 52*q* via the manipulating lever 63 and the electromagnetic inverse-proportional valves 61 and 62. The pilot pump is driven by the power source 41 to supply the oil from the tank 42 to the pilot chamber 52*p* and the opposing pilot chamber 52*q*.

The manipulating lever 63 is a manipulation device manipulated by an operator of the construction machine 1 to generate hydraulic pressure corresponding to the degree of lever movement made by the operator. The manipulating lever 63 is manipulated to drive the crawler 22 and the upper slewing body 10. By pushing forward the manipulating lever 63 according to the embodiment, the hydraulic pressure is supplied from the pilot pump only to the pilot chamber 52*p* via the electromagnetic inverse-proportional valve 61. The control valve 52 is thereby set to the first operating position 52*a*. By pushing rearward the manipulating lever 63, the hydraulic pressure is supplied from the pilot pump only to the opposing pilot chamber 52*q* via the electromagnetic inverse-proportional valve 62. The control valve 52 is thereby set to the second operating position 52*b*. When the manipulating lever 63 is not manipulated, the manipulating lever 63 stands upright by itself and the oil paths respectively connected to the pilot chamber 52*p* and the opposing pilot chamber 52*q* are in communication with the tank 42, which causes both the pilot chamber 52*p* and opposing pilot chamber 52*q* to be in the atmospheric pressure. The control valve 52 is thereby set to the neutral position 52*c*.

The electromagnetic inverse-proportional valves 61 and 62 reduce a primary pressure supplied by the pilot pump to a pressure not higher than a secondary pressure (arbitrary secondary pressure) as an upper limit corresponding to the input current given by the controller 31. In a case without restriction on traveling of the lower travelling body 20, a predetermined initial current is supplied to the electromagnetic inverse-proportional valves 61 and 62 to set the secondary pressure to a predetermined upper limit. In a case with restriction on the traveling of the lower travelling body 20, the secondary pressure is set to a limiting value corresponding to the input current given by the controller 31 to the electromagnetic inverse-proportional valves 61 and 62, where the limiting value is smaller than the upper limit. The input current (command current) is input to the electromagnetic inverse-proportional valves 61 and 62. Larger the input current to the electromagnetic inverse proportional valves 61 and 62 is, lower the secondary pressure is. By supplying the upper limit current from the controller 31 to the electromagnetic inverse-proportional valves 61 and 62, the electromagnetic inverse-proportional valves 61 and 62 are closed and the hydraulic pressure is not supplied to the pilot chamber 52*p* and the opposing pilot chamber 52*q*. That is, traveling of the lower travelling body 20 is stopped.

The hydraulic circuit 140 has almost the same configuration as the hydraulic circuit 40 for operating the lower travelling body 20. Thus, the component configured the same as that of the hydraulic circuit 40 is appended with the same reference sign and the description thereof is omitted. As illustrated in FIG. 3, the hydraulic circuit 140 includes the power source 41, the tank 42, a drive circuit 150, and the pilot circuit 160. The components such as the power source 41, the tank 42, and the hydraulic pump 51 are used in common by the hydraulic circuit 40 but may be provided as separate components. The drive circuit 150 is for driving a slewing motor 123 and includes the hydraulic pump 51, the slewing motor 123, and a control valve 152. The hydraulic pump 51 is driven by the power source 41 to supply oil from the tank 42 to the slewing motor 123.

The slewing motor 123 operates the upper slewing body 10 to slew. That is, the slewing motor 123 generates the driving force for slewing (driving) the upper slewing body 10. The control valve 152 controls, in a similar manner as the control valve 52, the operation of the slewing motor 123. In more detail, the operating speed of the slewing motor 123, that is, the slewing speed of the upper slewing body 10, becomes slower for a lower pilot pressure that creates a smaller valve opening. The control valve 152 has different switching positions which are a first operating position 152*a*, a second operating position 152*b*, and a neutral position 152*c*. The control valve 152 has a pilot chamber 152*p* and an opposing pilot chamber 152*q*.

The first operating position 152*a* and the second operating position 152*b* are for operating the slewing motor 123 where the oil is supplied from the hydraulic pump 51 to the slewing motor 123. The first operating position 152*a* is for slewing the upper slewing body 10 rightward (clockwise in FIG. 1). The second operating position 152*b* is for slewing the upper slewing body 10 leftward (counterclockwise in FIG. 1). The neutral position 52*c* is for stopping the slewing motor 123 where the oil path between the hydraulic pump 51 and the slewing motor 123 is cut off.

The pilot pressure is input to each of the pilot chamber 152*p* and the opposing pilot chamber 152*q*. The control valve 152 is set to the neutral position 152*c* when the pilot pressure input to the pilot chamber 152*p* is equal to the pilot pressure input to the opposing pilot chamber 152*q*. When the pilot pressure input to the pilot chamber 152*p* is higher than the pilot pressure input to the opposing pilot chamber 152*q*, the control valve 152 is set to the first operating position 152*a*. When the pilot pressure input to the opposing pilot chamber 152*q* is higher than the pilot pressure input to the pilot chamber 152*p*, the control valve 152 is set to the second operating position 152*b*.

The pilot circuit 160, configured almost similar to the pilot circuit 60, includes a pilot pump (not shown), two electromagnetic inverse-proportional valves 161 and 162, the manipulating lever 163, and a manipulation detecting unit 64 having two pressure sensors 65 and 66. The two pressure sensors 65 and 66 included in the pilot circuit 160 are disposed to measure the pressure value of the oil path connecting the manipulating lever 163 and the pilot chamber 152*p* and the pressure value of the oil path connecting the manipulating lever 163 and the opposing pilot chamber 152*q*. The manipulation detecting unit 64 detects the pressure supplied to the primary side of the electromagnetic inverse-proportional valves 161 and 162 by an operator manipulating the manipulating lever 163 and outputs the pressure to a controller 31 which will be described later. The pilot pump is connected to the pilot chamber 152*p* and the opposing pilot chamber 152*q* via the manipulating lever 163 and the electromagnetic inverse-proportional valves 161 and 162. The pilot pump is driven by the power source 41 to supply the oil from the tank 42 to the pilot chamber 152*p* and the opposing pilot chamber 152*q*. That is, the manipulation detecting unit 64 detects a manipulation given to the manipulation device and outputs a signal corresponding to the manipulation to a controlling unit 31*a*.

The manipulating lever 163, configured almost the same as the manipulating lever 63, also generates hydraulic pressure corresponding to the degree of lever movement given by the operator. By pushing rightward the manipulating lever 163 according to the embodiment, the hydraulic pressure is supplied from the pilot pump only to the pilot chamber 152*p* via the electromagnetic inverse-proportional valve 161. The control valve 152 is thereby set to the first operating position 152a. By pushing leftward the manipulating lever 163, the hydraulic pressure is supplied from the pilot pump only to the opposing pilot chamber 152q via the electromagnetic inverse-proportional valve 162. The control valve 152 is thereby set to the second operating position 152b. When the manipulating lever 163 is not manipulated, the manipulating lever 163 stands upright by itself and the oil paths respectively connected to the pilot chamber 152p and the opposing pilot chamber 152q are in communication with the tank 42, which causes both the pilot chamber 152p and opposing pilot chamber 152q to be in the atmospheric pressure. The control valve 152 is thereby set to the neutral position 152c.

The electromagnetic inverse-proportional valves 161 and 162, configured almost the same as the electromagnetic inverse-proportional valves 61 and 62, reduce a primary pressure supplied by the pilot pump to a pressure not higher than a secondary pressure (arbitrary secondary pressure) as an upper limit corresponding to the input current given by the controller 31. In a case without restriction on slewing of the upper slewing body 10, a predetermined initial current is supplied to the electromagnetic inverse-proportional valves 161 and 162 to set the secondary pressure to a predetermined upper limit. In a case with restriction on the slewing of the upper slewing body 10, the secondary pressure is set to a limiting value corresponding to the input current given by the controller 31 to the electromagnetic inverse-proportional valves 161 and 162, where the limiting value is smaller than the upper limit. The input current (command current) is input to the electromagnetic inverse-proportional valves 161 and 162. Larger the input current to the electromagnetic inverse-proportional valves 161 and 162 is, lower the secondary pressure is. By supplying the upper limit current from the controller 31 to the electromagnetic inverse-proportional valves 161 and 162, the electromagnetic inverse-proportional valves 161 and 162 are closed and the hydraulic pressure is not supplied to the pilot chamber 152p and the opposing pilot chamber 152q. That is, slewing of the upper slewing body 10 is stopped.

The control system 3 detects an obstacle in the periphery of the construction machine 1 and restricts an operation (travelling and slewing) of the construction machine 1. As illustrated in FIG. 2, the control system 3 includes the controller 31, four obstacle detecting devices 32 (see FIG. 1, and only one of the obstacle detecting devices 32 is illustrated in FIG. 2), the electromagnetic inverse-proportional valves 61, 62, 161, and 162, and the manipulation detecting unit 64. Two electromagnetic inverse-proportional valves 61 and two electromagnetic inverse-proportional valves 62 are provided in each pilot circuit 60. The controller 31 includes the controlling unit 31a and a storage unit 31b.

The controlling unit 31a executes input and output of signals, arithmetic (e.g., calculation and determination), and control to control slewing of the upper slewing body 10 and travelling of the lower travelling body 20. Based on the information on the distance to the obstacle detected by the four obstacle detecting devices 32, the controlling unit 31a stops slewing of the upper slewing body 10 and travelling of the lower travelling body 20. To stop the operations of the upper slewing body 10 and the lower travelling body 20, the controlling unit 31a inputs an upper limit current to the electromagnetic inverse-proportional valves 61, 62, 161, and 162. The controlling unit 31a controls operations of the hydraulic motor 23 and the slewing motor 123. The controlling unit 31a includes a stop-processing unit that executes stop-processing (emergency-stop-processing) and continuous-stop-processing, a storage-processing unit that executes storage-processing, a deletion-processing unit that executes deletion-processing, and a determination unit that executes determination-processing and obstacle-determination-processing. Each processing will be described later.

The storage unit 31b stores information and is provided as a memory area of the controller 31. The storage unit 31b stores area-data, which is the data related to a stop-area R previously determined in the periphery of the upper slewing body 10. As illustrated in FIG. 1, the stop-area R is determined in a region that is further to the rear, in the front-and-rear direction (B) of the upper slewing body 10, than the front end of the upper slewing body 10. The stop-area R is determined in the periphery of the upper slewing body 10 to form a U-shape. The area-data does not include the area occupied by the lower travelling body 20. Thus, even when the obstacle detecting device 32 detects the lower travelling body 20 (crawler 22), the obstacle detecting device 32 does not determine that the lower travelling body 20 exists as an obstacle in the stop-area R. The storage unit 31b stores a manipulate-instruction (manipulate-instruction based on pressure values output from the pressure sensors 65 and 66 to instruct the direction to which the lower travelling body 20 travels and the direction to which the upper slewing body 10 slews) that is given when the stop-processing, which will be described later, is executed. The manipulate-instruction stored in the storage unit 31b is deleted by executing a manipulation different from the stored manipulate-instruction (for example, by returning the manipulating lever 63 or 163 to the upright position (neutral position) where the manipulating lever 63 or 163 stands upright by itself).

As illustrated in FIG. 1, each obstacle detecting device 32 can detect an obstacle (that is, an object or a person) in the stop-area R defined in the periphery of the construction machine 1. The four obstacle detecting devices 32 are mounted on the upper portion, with regard to the vertical direction (D), of the upper slewing body 10. In more detail with regard to the front-and-rear direction (B) of the upper slewing body 10, the two obstacle detecting devices 32 are provided on the left side and the right side of the front end of the upper slewing body 10, and the two obstacle detecting devices 32 are provided on the left side and the right side of the rear end (counter weight 12) of the upper slewing body 10. The four obstacle detecting devices 32 detect an obstacle in the stop-area R.

The obstacle detecting device 32 according to the embodiment is a three-dimensional range sensor that can obtain an image and a distance. The obstacle detecting device 32 is not limited and may be any sensor that can detect whether an obstacle exists in the stop-area R (for example, a pyroelectric sensor).

Figure 4:
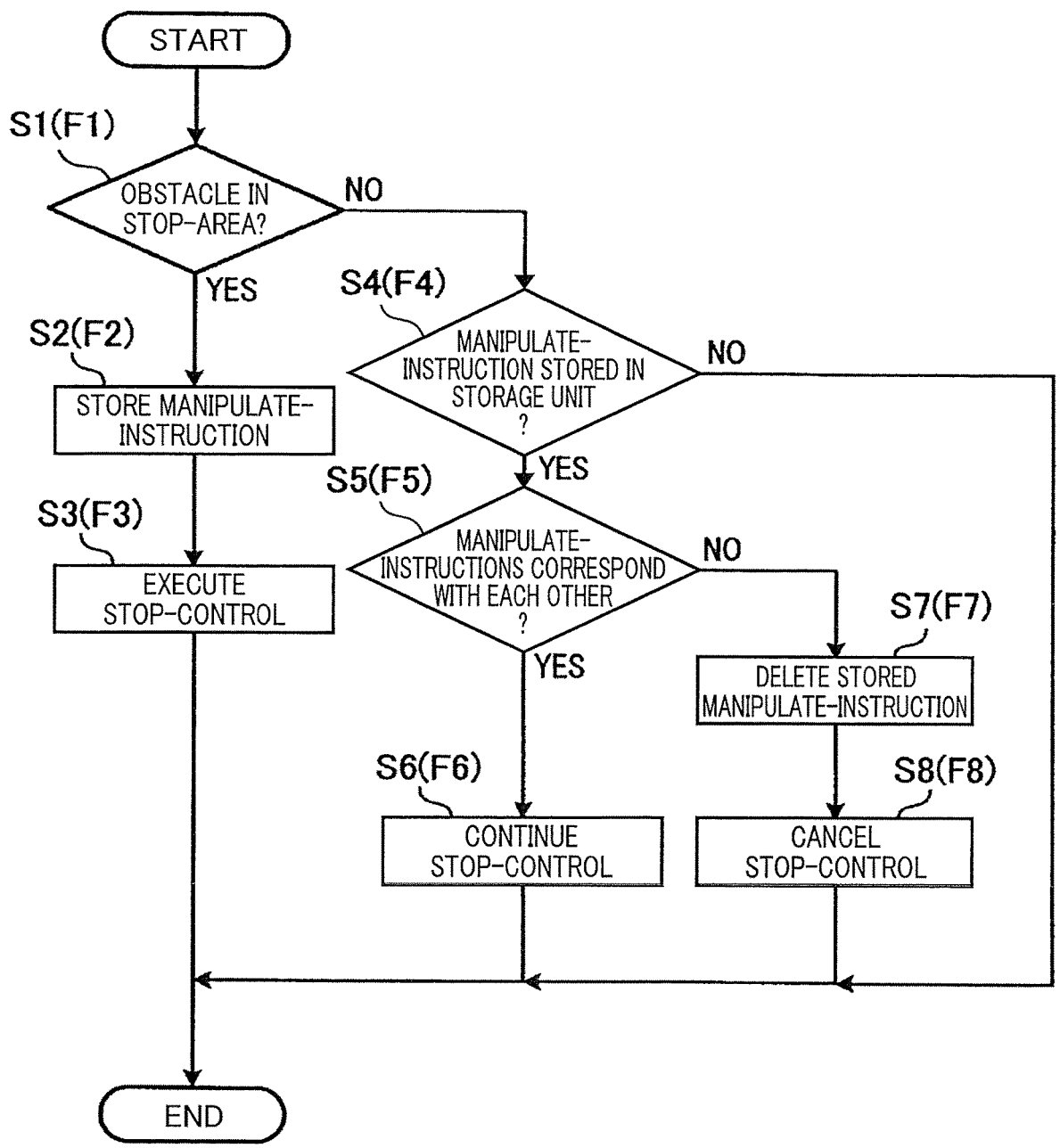
FIG. 4 is a control flowchart related to stopping an operation of the construction machine illustrated in FIG. 1.
Figure 5A:
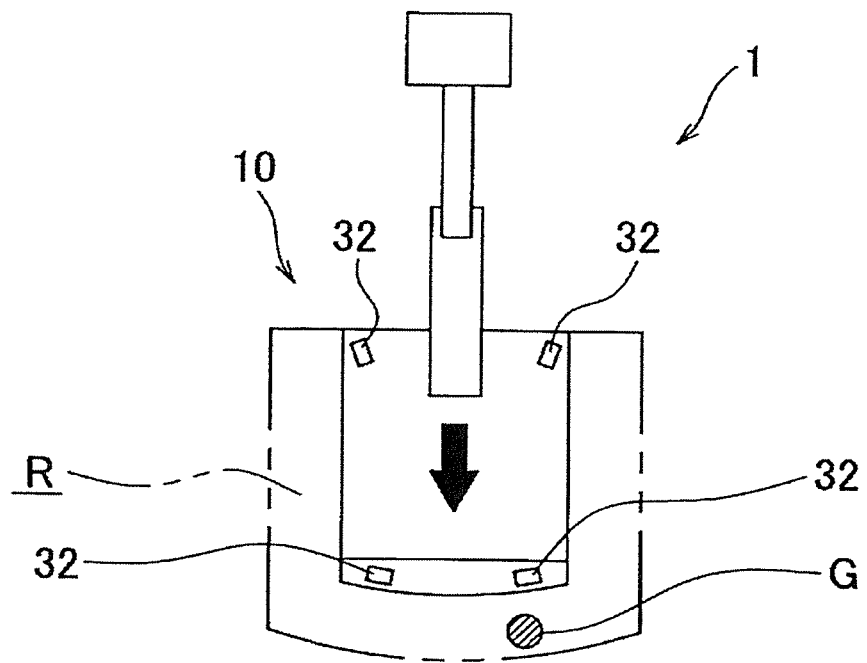
Figure 5B:
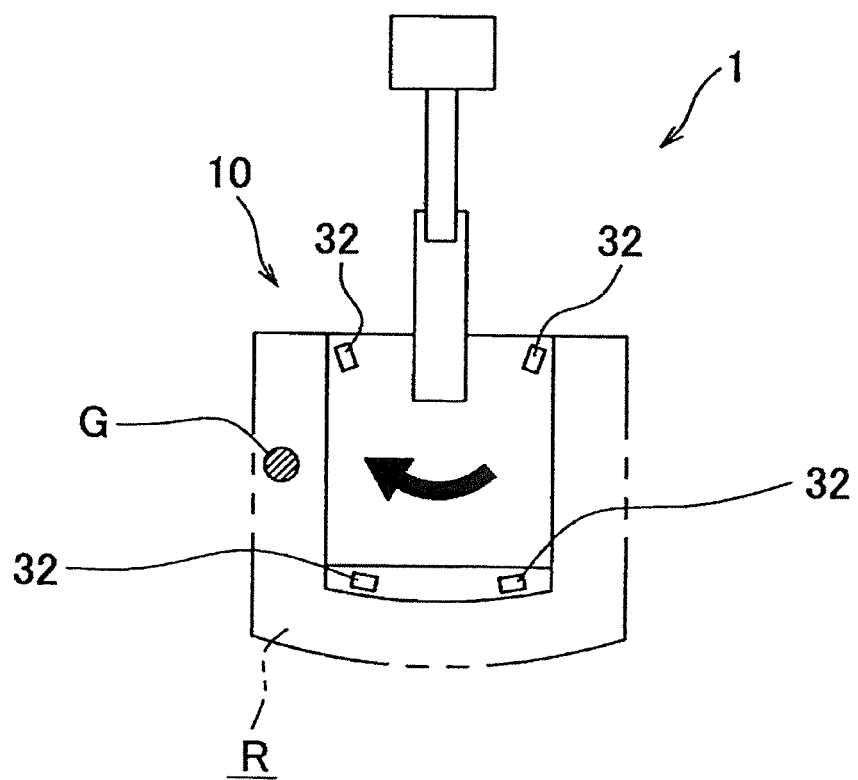

A control flowchart related to stopping an operation of the construction machine 1 will now be described with reference to FIGS. 4 and 5. FIG. 4 is a control flowchart related to stopping an operation of the construction machine 1 illustrated in FIG. 1. FIGS. 5A and 5B illustrate an obstacle existing in a peripheral region of the vehicle body 2 of the construction machine 1 illustrated in FIG. 1. FIG. 5A illustrates the lower travelling body 20 moving backward. FIG. 5B illustrates the upper slewing body 10 slewing rightward.

First, the control flowchart representing an operator manipulating the manipulating lever 63 to move the lower travelling body 20 backward, for example, will be described.

As illustrated in FIG. 5A, when the construction machine 1 is moving backward (to the direction indicated by an arrow in FIG. 5A) by travelling of the lower travelling body 20, the controlling unit 31a determines whether an obstacle G exists in the stop-area R based on information on a distance, which is the distance to the obstacle G, detected by the obstacle detecting device 32 in step S1 as illustrated in FIG. 4 (obstacle-determination-processing). As illustrated in FIG. 5A, the processing proceeds to step S2 when the obstacle G exists in the stop-area R (YES in step S1).

In step S2, the controlling unit 31a stores the manipulate-instruction that is output from the manipulation detecting unit 64 (first manipulation information: a manipulate-instruction to move the lower travelling body 20 backward in this case) in the storage unit 31b (storage-processing). In the embodiment, when the lower travelling body 20 is travelling, the lower travelling body 20 is stopped when the obstacle G exists in the stop-area R. The manipulate-instruction that is given when the lower travelling body 20 is stopped is stored in the storage unit 31b in step S2.

Then, in step S3, the controlling unit 31a supplies an upper limit current to the electromagnetic inverse-proportional valves 61 and 62 to close the electromagnetic inverse-proportional valves 61 and 62, thereby executing the control of stopping the travelling of the lower travelling body 20 (stop-processing or emergency-stop-processing). The process thus ends.

The obstacle-determination-processing (step S1) is repeated while the engine of the construction machine 1 is running. The processing proceeds to step S4 when the obstacle G does not exist in the stop-area R in step S1 (NO in step S1). In step S4, the controlling unit 31a determines whether the storage unit 31b stores the manipulate-instruction. When the stop-processing is not executed, the manipulate-instruction is not stored in the storage unit 31b (NO in step S4), and the process ends. With no obstacle G existing in the stop-area R, the lower travelling body 20 continues travelling.

As described above, the processing proceeds from step S2 to step S3, and when the stop-processing has been executed, the manipulate-instruction is stored in the storage unit 31b. Then, step S1 is executed again and the processing proceeds from step S1 to step S4. While the stop-processing is still being executed, when the obstacle G is not detected in the stop-area R but the manipulate-instruction is stored in the storage unit 31b in step S4 (YES in step S4), the processing proceeds to step S5.

In step S5, the controlling unit 31a determines whether the previous manipulate-instruction stored in the storage unit 31b (the first manipulation information: the manipulate-instruction to move the lower travelling body 20 backward) corresponds with the current manipulate-instruction newly detected by the manipulation detecting unit 64 (second manipulation information) (determination-processing). When the current manipulate-instruction continues from the previous manipulate-instruction, it is determined that both manipulate-instructions correspond with each other (YES in step S5), and the proceeding proceeds to step S6.

The proceeding proceeds from step S5 to step S6 in such a case that the operator continues the manipulation that has been given at the time the stop-processing has been executed and the obstacle G is temporarily not detected in the stop-area R. Then, in step S6, the controlling unit 31a supplies the upper limit current to the electromagnetic inverse-proportional valves 61 and 62 to close the electromagnetic inverse-proportional valves 61 and 62, and thereby executes the control of stopping the travelling of the lower travelling body 20 (continuous-stop-processing). In this manner, the present stop-processing continues. The control executed to perform the continuous-stop-processing is similar to the control executed to perform the emergency-stop-processing, and thus the control is not needed to be executed again. In this case, the controlling unit 31a may simply continue the control to continue the emergency-stop-processing. The process thus ends.

In step S5, for example, when the operator returns the manipulating lever 63 to the neutral position to stop manipulating, the current manipulate-instruction (the second manipulation information) does not correspond with the previous manipulate-instruction (the first manipulation information) (NO in step S5), and the processing proceeds to step S7. In step S7, the controlling unit 31a deletes the manipulate-instruction stored in the storage unit 31b when the predetermined condition that the manipulate-instructions do not correspond with each other is satisfied in the determination-processing in step S5 (deletion-processing). How to delete the manipulate-instruction stored in the storage unit 31b is not limited. For example, the controlling unit 31a may delete the manipulate-instruction stored in the storage unit 31b by manipulating a lever-lock (not shown) in the operator's room or by the operator pushing a dedicated reset switch. The predetermined condition to execute the deletion-processing may be any condition that includes operator's stopping manipulation of the manipulating lever 63 when the stop-processing is executed.

In step S8, the controlling unit 31a supplies a predetermined initial current to the electromagnetic inverse-proportional valves 61 and 62 to cancel the stopping of the travelling of the lower travelling body 20. As a result, the lower travelling body 20 can travel normally. The process thus ends.

The control flowchart of slewing the upper slewing body 10 rightward by an operator manipulating the manipulating lever 163 will now be described. The control flowchart is similar to the control flowchart of the lower travelling body 20, and thus the control flowchart will be described below with reference to FIG. 4.

As illustrated in FIG. 5B, when the upper slewing body 10 is being slewed rightward (the direction indicated by an arrow in FIG. 5B), the controlling unit 31a determines whether an obstacle G exists in the stop-area R based on information on a distance, which is the distance to the obstacle G detected by the obstacle detecting device 32 in step F1 as illustrated in FIG. 4 (obstacle-determination-processing). As illustrated in FIG. 5B, the processing proceeds to step F2 when the obstacle G exists in the stop-area R (YES in step F1).

In step F2, the controlling unit 31a stores the manipulate-instruction output from the manipulation detecting unit 64 (first manipulation information: a manipulate-instruction to slew the upper slewing body 10 rightward in this case) in the storage unit 31b (storage-processing). In the embodiment, when the upper slewing body 10 is slewing and the obstacle G exists in the stop-area R, the slewing of the upper slewing body 10 is stopped. The controlling unit 31a stores the manipulate-instruction given when the upper slewing body 10 is stopped in the storage unit 31b in step F2.

Then, in step F3, the controlling unit 31a supplies an upper limit current to the electromagnetic inverse-proportional valves 161 and 162 to close the electromagnetic inverse-proportional valves 161 and 162, thereby executing the control of stopping the slewing of the upper slewing body 10 (stop-processing or emergency-stop-processing). The process thus ends.

Step F1 is repeated, and the proceeding proceeds to step F4, similar to step S4 described above, when the obstacle G does not exist in the stop-area R (NO in step F1). In step F4, when the stop-processing is not executed, the manipulate-instruction is not stored in the storage unit 31*b* (NO in step F4), and the process ends. With no obstacle G existing in the stop-area R, the upper slewing body 10 continues slewing.

When the proceeding proceeds from step F1 to step F4 while the stop-processing is being executed, the manipulate-instruction is stored in the storage unit 31*b*. That is, the processing proceeds to step F5 when the manipulate-instruction is stored in the storage unit 31*b* in step F4 (YES in step F4).

In step F5, in a manner similar to step S5, the controlling unit 31*a* determines whether the previous manipulate-instruction stored in the storage unit 31*b* (first manipulation information: a manipulate-instruction to slew the upper slewing body 10 rightward) corresponds with the current manipulate-instruction detected by the manipulation detecting unit 64 (second manipulation information) (determination-processing). When the current manipulate-instruction continues from the previous manipulate-instruction, both manipulate-instructions corresponds with each other (YES in step F5), then the processing proceeds to step F6. In step F6, in a manner similar to step S6, the controlling unit 31*a* supplies the upper limit current to the electromagnetic inverse-proportional valves 161 and 162 to close the electromagnetic inverse-proportional valves 161 and 162, and thereby executes the control of stopping the slewing of the upper slewing body 10 (continuous-stop-processing). In this manner, the present stop-processing continues. The continuous-stop-processing is similar to the emergency-stop-processing, and thus the control is not needed to be executed again. In this case, the controlling unit 31*a* may simply continue the control to continue the stop-processing. The process thus ends.

In step F5, when the operator returns the manipulating lever 163 to the neutral position to stop manipulating, the current manipulate-instruction does not correspond with the previous manipulate-instruction (NO in step F5), and the processing proceeds to step F7 similar to step S7. In step F7, the controlling unit 31*a* deletes the manipulate-instruction stored in the storage unit 31*b* (deletion-processing).

In step F8, in a manner similar to step S8, the controlling unit 31*a* supplies a predetermined initial current to the electromagnetic inverse-proportional valves 161 and 162 to cancel the stopping of the slewing of the upper slewing body 10. As a result, the upper slewing body 10 can slew normally. The process thus ends.

As described above, in the construction machine 1 according to the embodiment, although the obstacle G is not detected by the obstacle detecting device 32 while the stop-processing (emergency-stop-processing) is executed in step S3 or F3, the continuous-stop-processing is performed to continue the stop-processing executed in step S6 or F6 when the manipulate-instruction detected by the manipulation detecting unit 64 continues. Thus, even when the obstacle G is temporarily not detected while the stop-processing is being executed, the stop-processing continues and thus collision against the obstacle G is prevented. This improves safety.

Furthermore, when the manipulate-instructions correspond with each other in the determination-processing in step S5 or F5, the processing in step S6 or F6 continues. In this manner, determination of whether to continue the stop-processing can be performed by a simple configuration.

In step S7 or F7, the controlling unit 31*a* executes the deletion-processing of deleting the manipulate-instruction stored in the storage unit 31*b* when the predetermined condition that the manipulate-instructions correspond with each other is satisfied in the determination-processing in step S5 or F5. In this manner, the manipulate-instruction stored in the storage unit 31*b* is deleted when a manipulation that is different from the manipulate-instruction stored in the storage unit 31*b* is preformed, such as when an operator finishes manipulating the manipulating lever 63 or 163.

The vehicle body 2 includes the lower travelling body 20 and the upper slewing body 10. The lower travelling body 20 and the upper slewing body 10 are operated by the manipulating levers 63 and 163. In the construction machine 1 including the lower travelling body 20 and the upper slewing body 10, even when the obstacle is temporarily not detected while the stop-processing is being executed, the stop-processing continues and thus collision against the obstacle is prevented. This improves safety.

Furthermore, in steps S1 and F1, the controlling unit 31*a* determines whether the obstacle G exists in the stop-area R based on the information on a distance from the obstacle detecting device 32. In this manner, the stop-processing is executed according to the distance to the obstacle G.

The preferred embodiment according to the present invention has been described above. The present invention is not limited to the embodiment described above, and various modifications can be made for the embodiment. In the embodiment described above, the stop-processing is executed when the obstacle G is detected in the stop-area R while the upper slewing body 10 is operated to slew and the lower travelling body 20 is operated to travel. However, the stop-processing may be executed when only either one of the operations is performed. The moving section of the vehicle body 2 may be a section other than the slewing section of the upper slewing body 10 and the travelling section of the lower travelling body 20. When the obstacle detecting device 32 only detects whether the obstacle G exists in the stop-area R, whether the obstacle G exists in the stop-area R may be determined in the obstacle-determination-processing in steps S1 and F1 based on whether the obstacle detecting device 32 detects the obstacle G.

The vehicle body 2 of the construction machine 1 may be a vehicle body that cannot slew, namely, the vehicle body that can only travel. Also, in this case, the control is executed in a similar manner to the stop-control executed as described above when the lower travelling body 20 is travelling. The vehicle body 2 of the construction machine 1 may be a vehicle body that cannot travel, namely, the vehicle body that can only slew. Also, in this case, the control is executed in a similar manner to the stop-control executed as described above when the upper slewing body 10 is slewing. Also, in this case, an effect similar to the effect described above can be obtained.

The determination-processing in steps S5 and F5 may be executed simply by determining whether the same signal is output from the manipulation detecting unit 64 to the controlling unit 31*a*. That is, determination may be made not by comparing the previous manipulate-instruction stored in the storage unit 31*b* (the first manipulation information) with the current manipulate-instruction (the second manipulation information) but by determining whether the same signal is continuously being output from the manipulation detecting unit 64. In this case, the stop-processing may be cancelled when a different signal is output from the manipulation detecting unit 64. Alternatively, only a single obstacle detecting device 32 may be provided.

The present invention provides a construction machine including a vehicle body having a moving section, a driving mechanism that generates a driving force for driving the moving section, a manipulation device that receives a manipulation given to drive the moving section, a controlling unit that controls an operation of the driving mechanism, a manipulation detecting unit that detects the manipulation given to the manipulation device and outputs a signal corresponding to an instruction of the manipulation to the controlling unit, and an obstacle detecting device that is mounted on the vehicle body and detects an obstacle in a periphery of the vehicle body. The controlling unit executes emergency-stop-processing and continuous-stop-processing, the emergency-stop-processing being executed to control the driving mechanism to stop an operation of the moving section regardless of a signal from the manipulation detecting unit, on a first condition satisfied upon detection of the obstacle by the obstacle detecting device when the controlling unit receives the signal from the manipulation detecting unit to control the driving mechanism to drive the moving section in accordance with a manipulation input to the manipulation device, the continuous-stop-processing being executed to control the driving mechanism to keep the operation of the moving section, which has been stopped by the emergency-stop-processing, stopped on a second condition satisfied by the obstacle detecting device not detecting the obstacle and the manipulation detecting unit detecting a manipulation given to the manipulation device when the operation of the moving section is stopped by the emergency-stop-processing.

In the configuration described above, the construction machine further includes a storage unit that stores an instruction of manipulation given to the manipulation device, in which the controlling unit is further capable of executing storage-processing, deletion-processing, and determination-processing, the storage-processing being executed to store first manipulation information in the storage unit, the first manipulation information being an instruction of the manipulation detected by the manipulation detecting unit when the emergency-stop-processing is executed, the deletion-processing being executed to delete the first manipulation information stored in the storage unit when a predetermined condition is satisfied, the determination-processing being executed to determine whether the first manipulation information stored in the storage unit corresponds with second manipulation information that is an instruction of the manipulation newly detected by the manipulation detecting unit when the emergency-stop-processing is executed and the obstacle detecting device does not detect the obstacle, and the controlling unit executes the continuous-stop-processing when the second condition is satisfied and it is determined that the first manipulation information corresponds with the second manipulation information in the determination-processing.

In the configuration described above, the predetermined condition may be satisfied when it is determined in the determination-processing that the first manipulation information corresponds with the second manipulation information.

In the configuration described above, the vehicle body includes a lower travelling body that travels, and an upper slewing body that slews relative to the lower travelling body, and the manipulation device may receive a manipulation given to at least drive the lower travelling body serving as the moving section or slew the upper slewing body serving as the moving section.

In the configuration described above, the obstacle detecting device outputs to the controlling unit the information on a distance to the obstacle which is detected, the controlling unit further executes obstacle-determination-processing of determining whether the obstacle exists in a predetermined stop-area in a periphery of the vehicle body based on the information on a distance from the obstacle detecting device to the obstacle, and the controlling unit executes the emergency-stop-processing when it is determined in the obstacle-determination-processing that the obstacle exists in the stop-area and that the first condition is satisfied by the obstacle detecting device detecting the obstacle.

This application is based on Japanese Patent application No. 2017-138038 filed in Japan Patent Office on Jul. 14, 2017, the contents of which are hereby incorporated by reference.

Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

The invention claimed is:
1. A construction machine comprising:
a vehicle body having a moving section;
a hydraulic motor that generates a driving force to drive the moving section;
a manipulating lever that receives a manipulation to drive the moving section;
a controlling unit that controls an operation of the hydraulic motor;
pressure sensors that detects the manipulation to the manipulating lever and outputs a signal corresponding to an instruction of the manipulation to the controlling unit;
an obstacle detecting sensor that is mounted on the vehicle body and configured to detect an obstacle in a periphery of the vehicle body; and
a storage unit that stores an instruction of a manipulation to the manipulating lever, wherein
the controlling unit executes emergency-stop-processing and continuous-stop-processing,
the emergency-stop-processing controls the hydraulic motor to stop an operation of the moving section regardless of a signal from the pressure sensors, when a first condition is satisfied upon detection of the obstacle by the obstacle detecting sensor when the controlling unit receives the signal from the pressure sensors to control the hydraulic motor to drive the moving section in accordance with a manipulation input to the manipulating lever,
the continuous-stop-processing controls the hydraulic motor to keep the operation of the moving section, which has been stopped by the emergency-stop-processing, stopped when a second condition is satisfied by the obstacle detecting sensor not detecting the obstacle and the pressure sensors detecting a manipulation to the manipulating lever when the operation of the moving section is stopped by the emergency-stop-processing,
the controlling unit further executes storage-processing and determination-processing,
the storage-processing stores first manipulation information in the storage unit, the first manipulation information being the manipulation detected by the pressure sensors when the emergency-stop-processing is started,
the determination-processing determines whether the first manipulation information stored in the storage unit corresponds with second manipulation information that is a manipulation newly detected by the pressure sen- sors when the emergency-stop-processing has been executed and the obstacle detecting sensor does not detect the obstacle, and the controlling unit executes in the determination-processing the continuous-stop-processing when the second condition is satisfied and it is determined that the first manipulation information corresponds with the second manipulation information.

2. The construction machine according to claim 1, wherein the controlling unit executes, in the determination-processing, deletion-processing of deleting the first manipulation information stored in the storage unit and cancelling execution of the emergency-stop-processing when a condition is satisfied by determining that the first manipulation information does not correspond with the second manipulation information.

3. The construction machine according to claim 1, wherein the vehicle body includes a lower travelling body that travels, and an upper slewing body that slews relative to the lower travelling body, and the manipulating lever receives a manipulation to at least drive the lower travelling body serving as the moving section or slew the upper slewing body serving as the moving section.

4. The construction machine according to claim 1, wherein the obstacle detecting sensor outputs a distance to the obstacle which is detected to the controlling unit, the controlling unit further executes obstacle-determination-processing of determining whether the obstacle exists in a predetermined stop-area in a periphery of the vehicle body based on the distance from the obstacle detecting sensor to the obstacle, and the controlling unit executes the emergency-stop-processing when it is determined in the obstacle-determination-processing that the obstacle exists in the stop-area and that the first condition is satisfied by the obstacle detecting sensor detecting the obstacle.

* * * * *